United States Patent [19]

Greene

[11] Patent Number: 5,017,974
[45] Date of Patent: May 21, 1991

[54] OPTICAL MODULATOR WITH SUPERLATTICE HAVING ASYMMETRIC BARRIERS

[75] Inventor: Peter D. Greene, Harlow, Great Britain

[73] Assignee: STC plc, London, England

[21] Appl. No.: 514,691

[22] Filed: Apr. 26, 1990

[30] Foreign Application Priority Data

May 12, 1989 [GB] United Kingdom ............... 8910993

[51] Int. Cl.⁵ ..................... H01L 49/00; H01L 29/205
[52] U.S. Cl. .......................................... 357/4; 357/16; 357/30; 350/355
[58] Field of Search ...................... 350/355; 357/4, 16, 357/30

[56] References Cited

U.S. PATENT DOCUMENTS

| | | | |
|---|---|---|---|
| 4,727,341 | 2/1988 | Nishi et al. | 357/16 |
| 4,878,104 | 10/1989 | Reed et al. | 357/16 |

FOREIGN PATENT DOCUMENTS

| | | | |
|---|---|---|---|
| 0249645 | 12/1987 | European Pat. Off. | 357/16 |
| 61-173218 | 8/1986 | Japan | 350/355 |
| 84/03397 | 8/1984 | PCT Int'l Appl. | 357/16 |
| 2204961 | 11/1988 | United Kingdom | 357/16 |

*Primary Examiner*—Jerome Jackson, Jr.
*Attorney, Agent, or Firm*—Lee, Mann, Smith, McWilliams & Sweeney

[57] ABSTRACT

A quantum confined Stark effect (QCSE) optical modulator element has one or more quantum wells each bounded by assymetric barriers. This provides a device in which the direction and magnitude of the electric field induced absorption edge shift corresponds to the polarity and intensity of an applied electric field.

6 Claims, 2 Drawing Sheets

OPTICAL MODULATOR WITH SUPERLATTICE HAVING ASYMMETRIC BARRIERS

BACKGROUND OF THE INVENTION

This invention relates to optical modulators, e.g. for optical communications systems, and in particular to modulation exhibiting the quantum confined Stark effect (QCSE). The invention further relates to a method of fabricating such modulators.

Electro-optic modulators employing the quantum confined Stark effect (QCSE) are of considerable interest as potential key components in optical communications systems. A description of a QCSE device is given for example by D. A. B. Miller et al in Phys. Rev., 1985, B32, p1043. The effect arises in a quantum well structure when an electric field is applied perpendicular to the plane of the quantum wells. This alters the confined energy states and shifts the absorption resonance to lower energy thus providing the basis for optical modulations and switches. In current QCSE devices the quantum wells have symmetric barriers. We have found that this structure provides a device in which the electrically induced shift of the absorption peak to longer wavelength is proportional to the sequence of the applied electric field. We have also found that the large wavelength shifts associated with higher applied fields are accompanied by a decrease in the light or intensity of the absorption peak. This effect limits the efficiency of the device.

In addition current devices suffer from the restriction that the wavelength shift is only towards longer wavelengths and is independent of the polarity or direction of the applied field.

The object of the invention is to provide an improved optical modulator.

SUMMARY OF THE INVENTION

According to the invention there is provided quantum confined Stark effect (QCSE) optical modulator element, including a semiconductor structure having an active layer comprising a quantum well structure provided with asymmetric barriers, the structure being such that, on application of an electric field thereto an energy absorption peak characteristic of the quantum wells is shifted in frequency, the magnitude and direction of the frequency shift corresponding to the intensity and polarity of the applied field.

According to the invention there is further provided a quantum confined Stark effect (QCSE) optical modulator element, including a semiconductor body having a planar layer incorporating a plurality of quantum wells, each said quantum well being bounded on its first and second surfaces by respective first and second semiconductor materials of differing composition whereby to provide a quantum well having asymmetric barriers, the arrangement being such that, on application of an electric field thereto an energy absorption peak characteristic of the quantum wells is shifted in frequency, the magnitude and direction of the frequency shift corresponding to the intensity and polarity of the applied field.

The quantum well structure provides a modulator element with improved characteristics. Application of an electric field to such an element shifts its absorption peak to a longer or shorter wavelength depending on the polarity of the applied electric field. This effect is in direct contrast to conventional QCSE modulators in which application of an electric field results in a wavelength shift independent of field polarity.

The band discontinuities at the heterojunction between each quantum well and its bounding layers are different on opposite sides of the well. For an indium gallium arsenide well and an indium phosphide bounding layer the valence band offset of about 0.37 eV exceeds that of the conduction band (about 0.25 eV) whereas the valence band offset for an indium aluminium arsenide bounding layer is about 0.2 eV which is less than that for the conduction band (about 0.5 eV). Consequently, in the presence of an applied electric field, the electron and hole functions are displaced towards opposite sides of the quantum well. The degree of asymmetry is inversely related to the thickness of the quantum well.

BRIEF DESCRIPTION OF THE DRAWINGS

Embodiments of the invention will now be described with reference to the accompanying drawings in which.

DESCRIPTION OF PREFERRED EMBODIMENT

Figure 1:
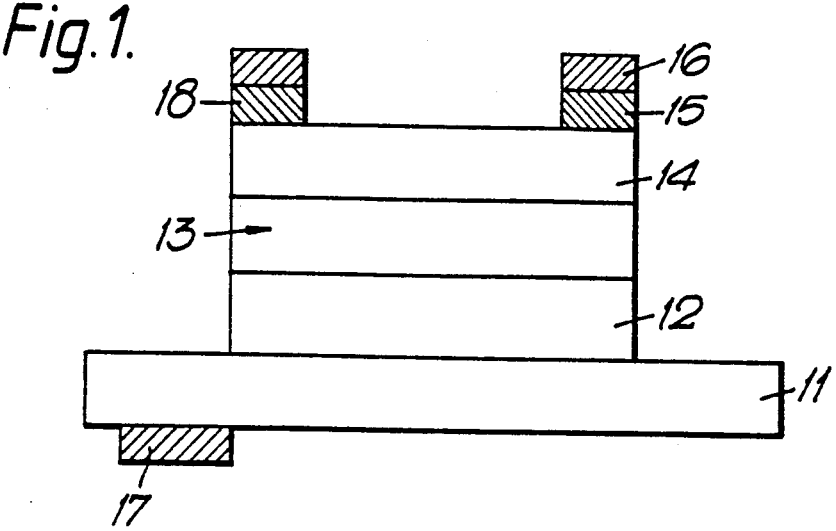
FIG. 1 is a cross-sectional view of a QCSE modulator element.

Referring to FIG. 1, the quantum confined Stark effect modulator element is formed on a substrate body 11 of a compound semiconductor, e.g. indium phosphide (InP). Typically the substrate body 11 is doped with an n-type dopant. The element structure is grown in the form of a mesa on the substrate 11 and comprises an n-doped indium phosphide buffer layer 12, a quantum well structure 13, an upper layer 14 of p-type indium phosphide and a surface layer, 15, typically of p-type indium gallium arsenide. Typically, the layers 12 and 14 are about 1 micron in thickness and the surface layer 15 is about 0.1 micron thick. Electrical contact to the element is provided by top electrode 16 and a back or substrate electrode 17. The function of the surface layer 15 is to reduce electrical resistance between the top electrodes 16 and the p-type indium phosphide layer 14.

The device shown in FIG. 1 is intended to modulate light in a vertical direction, i.e. perpendicular to the plane of the substrate. For this purpose a window 18 is formed in the upper layer 15 to allow light signals to pass through the structure.

In some applications an antireflection coating (not shown), e.g. of silicon nitride, may be applied to the exposed surface of the upper layer 15 within the window 18.

Figure 2:
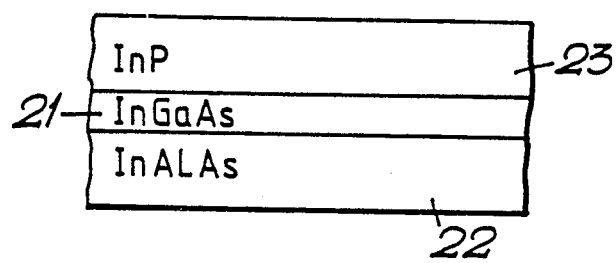
FIG. 2 shows schematically the quantum well structure of the modulator element of FIG. 1.

Referring now to FIG. 2, the quantum well structure is shown in detail. In this structure the quantum well is provided by a thin layer 21 of indium gallium arsenide. Typically this layer is about 20 to 30 A (2 to 3nm) in thickness and has the composition $In_{0.53}Ga_{0.47}As$. The quantum well layer 21 is bounded on one surface by a layer 22 of indium aluminium arsenide and the other surface by a layer 23 of undoped indium phosphide. These bounding layers 22, 23 are somewhat thicker than the quantum well layer 21, typically about 60 A (6nm). The indium aluminium arsenide layer may have the composition $In_{0.52}Al_{0.48}As$. The boundary layers 22, 23 provide the quantum well layer 21 with asymmetric potential barriers. The quantum well layer structure detailed above is repeated many times to form the quantum well structure of the device of FIG. 1. Typically, the layer structure of FIG. 2 is repeated one hundred times giving an overall thickness of about 1.5 microns. Each quantum well in this structure is thus bounded by asymmetric energy barriers. Since the energy band offsets are different on opposite sides of each quantum well, the electron and hole overlaps are not at their maximum values for a zero applied field, but increase or decrease as the field is applied with the appropriate polarity.

Figure 3:
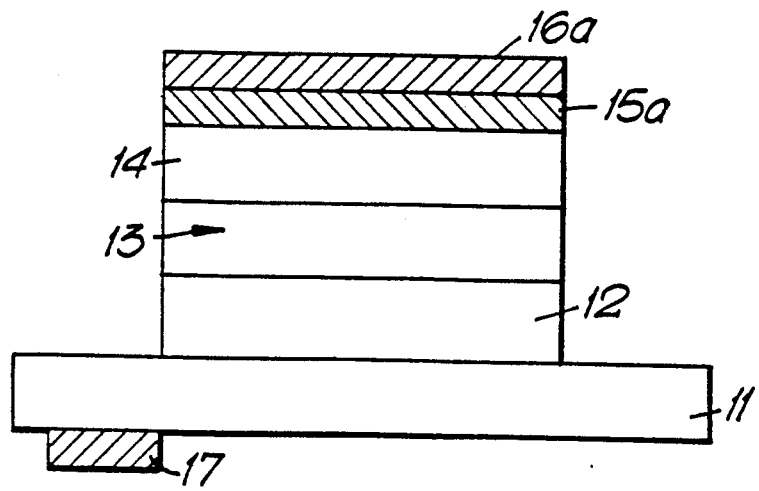
FIG. 3 shows a modified QCSE modulator element construction.

FIG. 3 shows a modified form of the device of FIG. 1. In this construction the surface layer 15a and top electrode 16a extend over the whole of the upper surface of the device. A light signal to be modulated is injected into the side of the device in the plane of the quantum well structure 13a.

Advantageously, the structures of FIGS. 1, 2 and 3 are formed by MOCVD growth of the semiconductor layer forming the structure on to an n-doped indium phosphide substrate.

Figure 4:
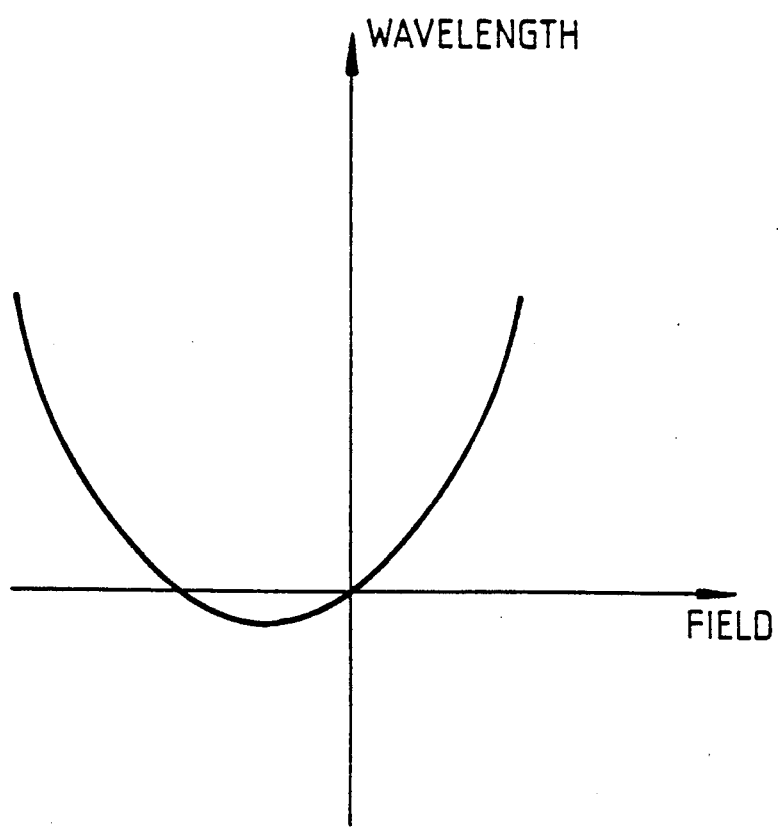
FIG. 4 shows a typical field/wavelength characteristic of the modulator of FIG. 1 or FIG. 3.

FIG. 4 illustrates a typical electric field-wavelength characteristic for the quantum well structure of FIGS. 1, 2 and 3. As can be seen from FIG. 4, the direction of the absorption wavelength shift corresponds to the polarity of the applied electric field. We have found that the shift to a shorter wavelength provided by the appropriate electrical bias is accompanied by an increase in the intensity of the absorption.

The optical modulator elements described above are of particular application in the construction of optical transmitters for fibre optic transmission systems. They are not however limited to this application but are of general use where optical modulation is required. In addition, the modulator element may be used as a single element or may form part of an array of similar modulation elements.

I claim:

1. A quantum confined Stark effect (QCSE) optical modulator element having an optical transmissivity corresponding to an electric field applied thereto, the modulator element comprising a multi layer quantum well structure disposed in a semiconductor body, wherein said quantum well structure comprises a repetitive sequence of a plurality of similar tri-layer structure, wherein each tri-layer structure consists of a first semiconductor layer constituting the quantum well, a second semiconductor layer on one surface of the first layer, and a third semiconductor layer on the other surface of the first layer, the second and third layers defining respective heterojunctions with the first quantum well layer, wherein the band discontinuity at the heterojunction between the second and first layers is such that the valence band offset exceeds the conduction band offset, and wherein the band discontinuity and the heterojunction between the third and first layers is such that the valence band offset is less than the conduction band offset whereby the quantum well layer is provided with assymetric barrier conditions.

2. A quantum confined Stark effect (QCSE) optical modulator element having an optical transmissivity corresponding to an electric field applied thereto, the modulator element comprising a multi-layer quantum well structure disposed in a semiconductor body, wherein said quantum well structure comprises a repetitive sequence of a plurality of similar tri-layer structures, wherein each tri-layer structure consists of a first, indium gallium arsenide layer constituting the quantum well, a second, indium aluminium arsenide layer constituting one heterojunction boundary of the quantum well, and a third, undoped indium phosphide layer constituting the other heterojunction boundary of the well, wherein at the heterojunction boundary between the second layer and the quantum well, the electron valence band offset is less than the conduction band offset by about 0.3 eV, wherein, at the heterojunction boundary between the third layer and the quantum well, the electron valence band offset exceeds the conduction band offset by about 0.1 eV whereby the quantum well is provided with assymetric barrier conditions such that, in the presence of an electric field, electron and hole functions are displaced respectively towards appropriate barriers of the quantum well, the degree of assymetry being inversely related to the thickness of the quantum well.

3. An optical modulator element as claimed in claim 2 and disposed on a substrate body of indium phosphide.

4. An optical modulator element as claimed in claim 3, wherein each said quantum well layer has the composition $In_{0.53}Ga_{0.47}As$.

5. An optical modulator element as claimed in claim 4, wherein each said second layer has the composition $In_{0.52}Al_{0.48}As$.

6. An optical modulation element as claimed in claim 5, wherein each said quantum well is from 20 Å to 30 Å (3nm) in thickness.

* * * * *